United States Patent [19]

Nelson

[11] Patent Number: 5,081,405
[45] Date of Patent: Jan. 14, 1992

[54] ELECTRICAL ACTUATOR WITH MEANS FOR PREVENTING DITHER AT A LIMIT SWITCH

[75] Inventor: Marvin D. Nelson, Savage, Minn.

[73] Assignee: Honeywell Inc., Minneapolis, Minn.

[21] Appl. No.: 677,937

[22] Filed: Apr. 1, 1991

[51] Int. Cl.⁵ .................................................. G05B 5/01
[52] U.S. Cl. ..................... 318/448; 318/286; 307/134
[58] Field of Search ............... 361/2, 3, 8, 9, 13; 307/134, 137; 318/563, 611, 626, 631, 256, 264, 265, 266, 282, 286, 448, 466, 467, 468, 478, 549, 558

[56] References Cited

U.S. PATENT DOCUMENTS

| 4,087,728 | 5/1978 | Porter | 318/466 |
|---|---|---|---|
| 4,131,831 | 12/1978 | Bochenek et al. | 318/282 |
| 4,438,472 | 3/1984 | Woodworth | 361/13 |
| 4,583,146 | 4/1986 | Howell | 361/13 |
| 4,833,376 | 5/1989 | Shimura | 318/286 |
| 4,888,537 | 12/1989 | Appel et al. | 318/626 |
| 4,972,129 | 11/1990 | Kawai et al. | 318/285 |

OTHER PUBLICATIONS

Bulletin T-787 of the Keystone Carbon Company, St. Marys, PA 15857—PTC Thermistor, pp. 38 and 39.

Primary Examiner—Bentsu Ro
Attorney, Agent, or Firm—Edward Schwarz

[57] ABSTRACT

The tendency of a motor-driven actuator driving against a dynamic (non-frictional) load to return upon reaching the limit switch sufficiently to again close the limit switch and create a persistent oscillation at the limit position can be prevented by placing a positive temperature coefficient thermistor across the limit switch involved. Such loads typically arise in actuators having spring-driven return capability, and can also arise when positioning air dampers and other loads where the actuator force is opposed by a spring or gravity.

5 Claims, 1 Drawing Sheet

ELECTRICAL ACTUATOR WITH MEANS FOR PREVENTING DITHER AT A LIMIT SWITCH

BACKGROUND OF THE INVENTION

Electrical actuators are used in a variety of systems to control the position of some mechanical device, and may be of either the rotary or linear type. In HVAC systems for example these mechanical devices may be a valve for controlling flow of fuel or hot water, or a damper for controlling air flow. Rotary actuators of the type involved here have their output element driven by a reversible electric motor through a gear train. Linear actuators may be either directly driven as by a solenoid or operate through a rack and a motor-driven pinion.

Regardless of the particular type of actuator, the motor or solenoid will have a first pair of power terminals to which is applied electric power for driving the motor in a first direction, and a second pair of power terminals for driving the motor in the opposite direction. The range of movement, or stroke range, for the output element is controlled at least one end by a limit switch through which the electrical power for the motor passes. A feature such as a cam or lever carried by the output element mechanically opens a limit switch when the output element reaches the limit position controlled by that limit switch.

It is most efficient from a standpoint of accurate control and minimum wear on the actuator and controlled device that the actuator hold the position to which its output element has been driven when power is removed from the drive motor or solenoid. Therefore, actuators are usually provided with a brake which is applied whenever power is removed from the motor, whether the power is removed by the control element of the system or by the limit switch. This brake may be applied by electric power supplied from the control circuitry of the actuator, or may be released by electric power and held set by a spring.

For certain types of mechanical devices, it is important if electrical power to the system is lost, that the actuator output element reset to what will be called a return position at one end of the stroke range. For example, if the actuator is controlling the position of a fuel valve, it is vital that the valve be promptly closed if electric power to the burner control device is lost. When this function is needed, an actuator may be provided with a return spring which drives the output element back toward its return position if power to the actuator control circuitry is lost. The brake for such an actuator will be of the type which is set by electric power and releases when power is not available to the control circuitry. When power is lost, the brake is released and the return spring acts to reset the output element to its return position. In a rotary actuator, such a spring is powerful enough to drive the drive motor in its reverse direction even through a relatively high ratio gear train. A mechanical stop is required to block the return spring from driving the output element past its return position. Such return springs are constantly wound and unwound as the motor drives the output element back and forth, so the motor must generate sufficient torque or force through its drive coupling to overcome the opposing spring load.

Certain types of actuator loads, which will be referred to hereafter as dynamic loads, not only oppose the torque provided by the actuator but also tend to drive the actuator's output element in the opposite direction when power is removed from the actuator. The return spring described above and used on some actuators is one example of such a dynamic load. But there are other types as well, such as an air damper's heavy shutters which tend through gravitational force to close and drive the actuator output element toward its return position when power is removed from the actuator which opened them.

In dynamic load situations, it is possible that when the limit position of the output element is reached and the limit switch opens, the dynamic load will cause the output element to return or reverse a sufficient amount to cause the limit switch to reclose before the brake sets. In this situation, the actuator motor then applies torque or force to the output element to again drive the element to the limit position and again open the limit switch. The actuator enters an oscillation or dither mode with the limit switch being constantly opened and closed. This situation has arisen where a rotary actuator has been redesigned to provide higher return torque in the return spring. Such a dither mode results in excessive wear on various parts of the actuator such as the motor, bearings, gear train if one is present, and limit switch, and premature failure of the actuator. At the same time, the clatter of an actuator operating in this mode is annoying and reduces the user's confidence, with some justification, in the reliability of the actuator itself.

It is possible to deal with this artifact of actuator operation by special design of the actuator's control circuitry which senses this dither and either removes power from the actuator or briefly overrides the limit switch, but this is an expensive and complex solution to the problem and also has the potential for damaging the driven mechanical device if the limit switch override feature should fail to function as designed. It is also possible to employ some type of special limit switch which has hysteresis in its operation, closing at a different position of the output element than it opens so that the small return of the output element when the limit switch opens does not cause the limit switch to reclose. Such a switch may be relatively complex and expensive and hence not desirable.

BRIEF DESCRIPTION OF THE INVENTION

I have discovered an improvement for such actuators which prevent dither of their output elements under the influence of a return dynamic load, comprising a positive temperature coefficient (PTC) element across the limit switch. Such an element has a very low but still appreciable impedance at low temperature, and a much higher impedance above a particular high temperature, hereafter the tripping temperature, and a very low thermal mass. For a preferred device of this type, called a PTC thermistor, there is a dramatic rise in impedance above a tripping temperature of approximately 110° C. When the limit switch is opened, all of the actuator motor current flows through the PTC element causing its temperature to very quickly rise to its tripping temperature. During the time that the temperature of the thermistor is rising toward the tripping temperature, the motor continues to drive the output element a very slight amount past the limit position. The high impedance presented by the PTC element after reaching its tripping temperature causes a trickle flow of current to the actuator to oppose return of the output element at the limit position until the brake is securely set. When power is later applied to the second set of actuator motor terminals to intentionally drive its output element toward the return position, power is removed from the first set and the PTC element cools to below its tripping temperature and its impedance drops to its low level. It can be seen that simply adding this circuit element can totally prevent such dither of the output element when positioned at its limit position with a dynamic load imposed.

DESCRIPTION OF THE PREFERRED EMBODIMENT

Figure 1:
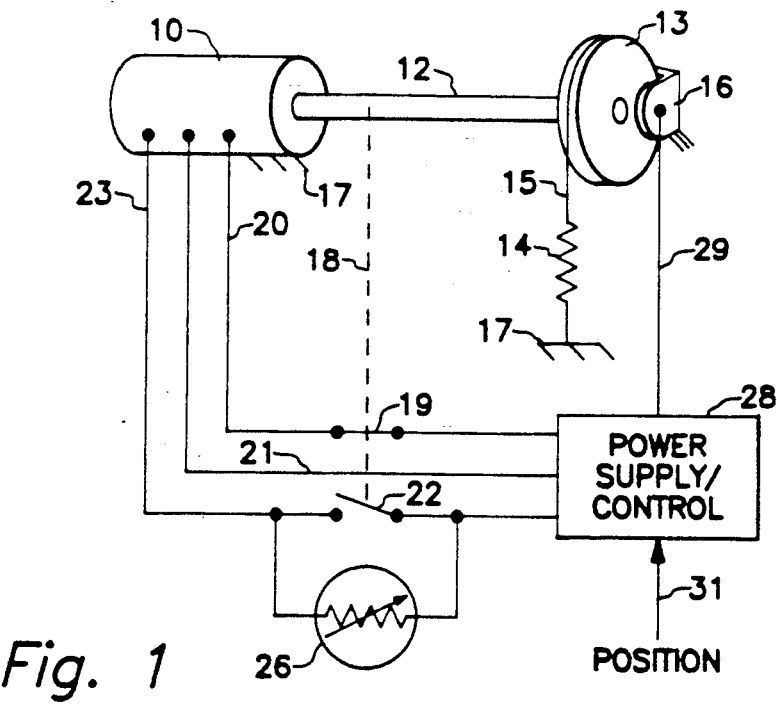
FIG. 1 is a circuit diagram and a mechanical outline of an actuator employing the invention.

In FIG. 1 there is shown a conventional rotary actuator having a drive motor 10 mounted on a symbolically shown frame 17 and having an output element comprising a shaft 12. Shaft 12 is typically driven by motor 10 through a gear train not shown. Shaft 12 is attached to some device for controlling its position. Operation of and power for motor 12 is provided by power supply/control circuitry 28 in response to position commands provided from an external source on a data path 31. Shaft 12 can be driven in the clockwise direction by electric power applied to motor 10 between paths 21 and 23 and in the counterclockwise direction by electric power applied to motor 10 between paths 21 and 20. Shaft 12 is shown as having a disk 13 fixed to its end on which a brake 16 acts under control of the control circuitry 28. A cable 15 is wound around the periphery of disk 13. One end of the cable is dead-ended to the periphery of the disk 13. The other end of cable 15 is attached to a mechanical extension spring 14 which is dead-ended to frame 17. It is the usual practice to use a coiled clock spring instead of the cable 13 and extension spring 14, but they are shown here as more clearly displaying the way in which the invention is applied. The point is that there is some type of dynamic load which is constantly urging the shaft 12 toward its return position, counterclockwise as shown in FIG. 1.

As mentioned, it is important for many typical controlled devices that they not be driven past some predetermined angular position. To accomplish this, it is usual to provide limit switches 19 and 22 through which electrical power flows for counterclockwise and clockwise rotation respectively of shaft 12. A mechanical connection 18 is shown symbolically as controlling the opening and closing of switches 19 and 22 according to the angular position of shaft 12. That is, when shaft 12 has been driven to its furthest allowable clockwise position, linkage 18 causes switch 22 to open and further rotation of actuator 10 ceases. When shaft 12 has been driven to its furthest counterclockwise position, linkage 18 causes switch 19 to open and further rotation of shaft 12 ceases. In each case when the limit switch 19 or 22 opens, the absence of current flow indicates to control 28 that the brake 16 should be applied. The situation shown in FIG. 1 represents the actuator 10 in its most clockwise position with switch 22 open and switch 19 closed. When a new position command is received at a later time on path 31, the brake 16 is unset and power is applied through the other of the control lines 20 or 23 and associated limit switch 19 or 22 to drive the shaft 12 in a direction opposite to that which it had previously been driven.

When shaft 12 reaches its most clockwise position causing switch 22 to open, typically several milliseconds at least elapse before brake 16 is applied. In the time between opening of switch 22 and application of brake 16, the torque on shaft 12 generated by spring 14 or by some other dynamic load in the controlled device can cause shaft 12 to rotate slightly counterclockwise. Because the linkage 18 typically has little backlash or slop, this can frequently cause switch 22 to close again and motor 10 drives shaft 12 clockwise to open switch 22. There is thus the oscillation alluded to earlier set up which has the potential to wear the actuator and annoy the user.

Figure 2:
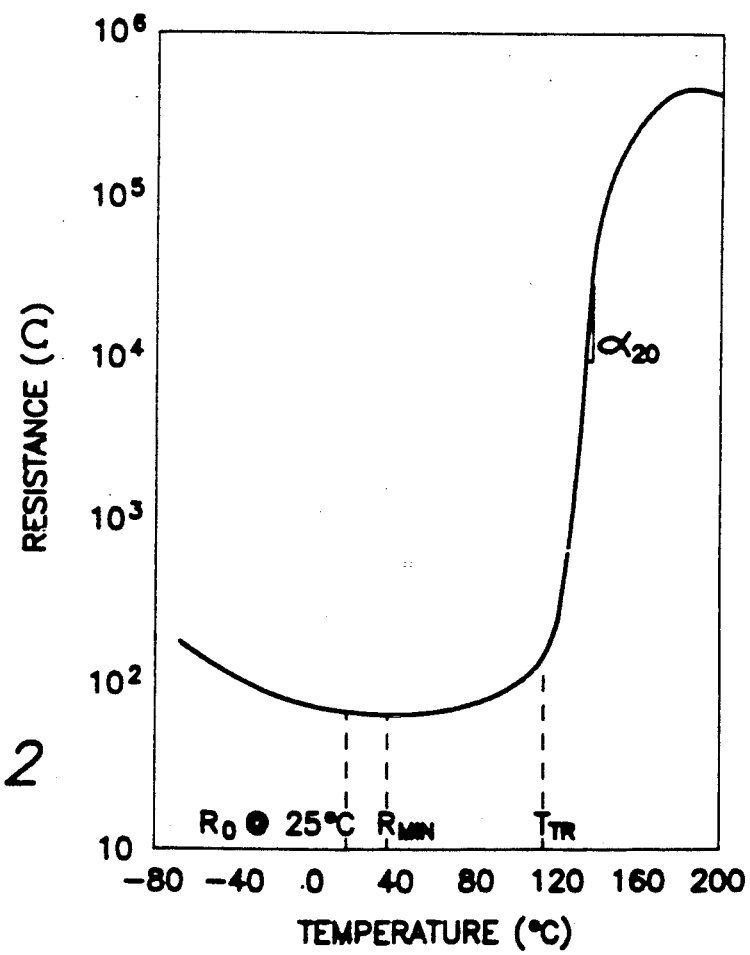
FIG. 2 is a graph of temperature versus resistance for a preferred PTC thermistor.

PTC element 26 is connected in parallel across the clockwise limit switch 22 to prevent this oscillation. A PTC element 26 is typically a thermistor having a typical resistance versus temperature characteristic such as is shown by FIG. 2. It can be seen that typical resistance is at a minimum of less than 100 Ω at about 25° C., rising to a value in excess of 10,000 Ω when thermistor temperature reaches more than 140° C. $T_{TR}$ in FIG. 2 refers to the temperature where resistance is twice the minimum. There is also a tripping temperature around 130° C. where current flow is insufficient to cause further significant torque output from motor 10.

In the application shown in FIG. 1, when switch 22 opens, current continues to flow through thermistor 26 to motor 10. Thermistor 26 is chosen to have a low temperature resistance sufficiently low to pass current on path 23 creating torque from motor 10 at least 75% of the rated torque. This amount of torque in connection with the normal friction in the motor bearings and the gear train is sufficient to prevent any dynamic load from rotating shaft 12 counterclockwise after switch 22 opens. Current passing through thermistor 26 causes resistance heating of the thermistor itself. As the temperature of thermistor 26 rises past $T_{TR}$ toward the tripping temperature, the resistance also rises, reducing the amount of current flow through thermistor 26. Current flow through path 23 is approximately inversely proportional to the thermistor 26 resistance. Since the heat generated in thermistor 26 is controlled by the $I^2R$ rule, one can see that the amount of heat generation drops as temperature of thermistor 26 increases. Eventually, a null point is reached where the heat produced by thermistor 26 is exactly balanced by the heat rejected. The thermal capacity and coefficient of thermistor 26 are such that $T_{TR}$ is not reached for a matter of at least a few tens of milliseconds, which is sufficient to drive shaft 12 slightly past the point at which switch 22 is opened by linkage 18 and shaft 12, assuring that there is no oscillation of the actuator. As current continues to flow and the thermistor temperature continues to rise, current flow drops precipitously as thermistor temperature nears the tripping temperature and becomes insufficient to cause further rotation of shaft 12. The current flow through the thermistor 26 when its temperature has reached steady state is too small to interfere with later driving of the shaft 12 in the counterclockwise direction by the control 31 supplying power on path 20.

After switch 22 closes during counterclockwise rotation of shaft 12, current flow through thermistor 26 ceases. With these thermistors, there is a thermal recovery period of several tens of seconds during which they cool down to near 25° C. point where their resistance becomes minimum. This thermal recovery period may in certain rare circumstances where the output element is driven from the limit position toward its return position and then immediately back to the limit position, induce a dither in the operation of the actuator. This is because thermistor 26 may not have time during this movement of shaft 12, to recover by cooling to below its tripping temperature before it is again called on to provide current to drive the output element past its limit position. If this is undesirable, then the design of control 28 may include some feature to prevent such a short interval between two commands to drive the shaft 12 from and to its limit position. If this feature is not present, it is possible that thermistor 26 may not serve to prevent the oscillation described above.

In a particular application for this invention, a preferred thermistor used for the assignee's actuators having Model Nos. M8182 and M8185 is one supplied by Keystone Carbon Company, St. Marys, PA 15857, and having type no. RL 3006-50-110-25-PTO.

It is obvious that the same concept may be used for a linear actuator having this oscillation problem. It should also be obvious that the clockwise and counterclockwise directions may be interchanged. It need not be a spring return feature which provides the dynamic return torque which generates the oscillation, but instead the controlled device itself may provide this dynamic return torque. The current flow during normal rated operation may also dictate the preferred thermistor characteristics in a specific application.

The preceding describes my invention. What I wish to claim by letters patent is:

1. In an actuator whose output element is driven by a motor having a pair of terminals for applying power to the motor for driving the motor in a first direction, a limit switch through which power for driving the motor in the first direction passes, and a feature on the output element for opening the limit switch when the output element drives in the first direction to a predetermined extreme position, an improvement for preventing dither of the output element under the influence of a dynamic load at the predetermined extreme position, comprising a positive temperature coefficient (PTC) circuit element connected across the limit switch.

2. The improvement of claim 1, wherein the positive temperature coefficient circuit element comprising a positive temperature coefficient thermistor.

3. The improvement of claim 1, wherein the dynamic load comprises a return spring on the output element which drives the output element in a second direction opposite to the first direction, and the positive temperature coefficient circuit element comprises a positive temperature coefficient thermistor.

4. The apparatus of claim 3, wherein the motor is of the type providing torque greater than that provided by the return spring while receiving current flowing through the PTC thermistor.

5. The apparatus of claim 1, wherein the motor is of the type providing torque greater than that provided by the dynamic load while receiving current flowing through the PTC circuit element.

* * * * *